Patented Jan. 8, 1929.

1,698,569

UNITED STATES PATENT OFFICE.

WILLIAM P. ter HORST, OF AKRON, OHIO, ASSIGNOR TO THE RUBBER SERVICE LABORATORIES COMPANY, OF AKRON, OHIO, A CORPORATION OF OHIO.

VULCANIZED-RUBBER COMPOSITION AND MANUFACTURE OF SAME.

No Drawing.   Application filed June 18, 1927.   Serial No. 199,872.

The present invention is directed to the manufacture of unsymmetrically substituted guanidines and to the use of such compounds as accelerators of the rubber vulcanization process. More particularly the invention relates to the manufacture and use in a rubber mix of a guanidine derivative containing within the molecule at least one aryl grouping and at least one cyclic grouping. The invention will be understood from the following description and examples wherein the invention is fully set forth and described.

Certain derivatives of guanidine have heretofore been employed as rubber vulcanization accelerators, particularly the symmetrical diaryl substituted guanidines, such as diphenylguanidine and di-o-tolyl-guanidine. Symmetrical tri-phenyl-guanidine was one of the first members of the series of guanidine compounds to be employed as an accelerator but its activity in the vulcanization process is so much less than that of the di-substituted guanidines, that the compound has long ceased to be of much commercial importance to the rubber industry.

I have now discovered a new type of guanidine derivative which comprises a class of active vulcanization accelerators. These compounds are derivatives of guanidine wherein there has taken place the substitution of an hydrogen of one amino group by an aryl group such as a phenyl group or homologue thereof and also the substitution of the hydrogens of a second amino group by a pentamethylene group. Such compounds are unsymmetrically substituted guanidines as is shown from the following formula of one typical member of the preferred class of accelerators, phenyl-piperidyl-guanidine;

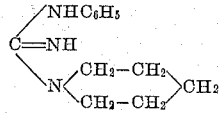

This compound has been manufactured by reacting cyananiline on piperidine hydrochloride in a solvent. Cyananiline and piperidine hydrochloride were dissolved in a suitable solvent such as xylene and the solution was then heated, preferably in a refluxing apparatus, substantially to the boiling point of the solvent employed for a period of several hours. The solvent was then removed from the mass preferably by distillation means under a pressure somewhat less than atmospheric. The reaction product was then extracted with a dilute acid such as hydrochloric acid, the acid solution was filtered and the guanidine base was obtained from the solution of its salt by precipitation by means of an alkaline solution, preferably of caustic soda. In case further purification of the product is desired this can be accomplished by solution in an acid followed by reprecipitation with an alkaline agent as before. The product so obtained is a light yellow, amorphous material that cannot be readily crystallized and which melts at approximately 131° C.

Other homologous products can be manufactured by replacing cyananiline employed in the example set forth with the cyanogen chloride reaction product of other aromatic primary amines and combining this product with piperidine hydrochloride or with the salts of other secondary cyclic amines as described. The resulting products are unsymmetrical substituted guanidines containing one imino group, an aryl group joined to a second imino group and a cyclic nucleus containing nitrogen, said nitrogen being joined to three carbon atoms.

Compounds of the type set forth have been found to yield vulcanized rubber products of high quality when employed as accelerators in the rubber mix. Thus, one rubber compound was mixed in the usual manner as a typical friction or tube stock. Such a mix comprised
100 parts pale crepe rubber,
  5 parts zinc oxide,
  3.5 parts sulphur,
  0.5 parts phenyl-piperidyl-guanidine.
Samples of the rubber compound so prepared were then vulcanized by heating in a press of the usual type maintained at the temperature given by forty pounds of steam pressure per square inch (287° F.). The vulcanized samples cured under the conditions set forth for from fifteen to forty-five minutes were then tested and their physical characteristics were determined. The following results were thereby obtained:

| Time of cure | Temperature of cure | Modulus of elasticity in lbs./in² at elongations of— | | | Tensile in lbs./in² at break | Ultimate elongation |
| --- | --- | --- | --- | --- | --- | --- |
| | | 300% | 500% | 700% | | |
| | | | | | | Per cent |
| 15 minutes | 287° F. | 99 | 178 | 420 | 1520 | 970 |
| 20 minutes | 287° F. | 120 | 216 | 582 | 1790 | 935 |
| 30 minutes | 287° F. | 141 | 260 | 931 | 2870 | 925 |
| 45 minutes | 287° F. | 194 | 377 | 1303 | 2795 | 850 |

It is seen from the above results that a fully vulcanized product of good commercial quality is obtained after vulcanizing the stock in the manner as described for approximately thirty minutes.

Another rubber stock capable of use as a tread stock in the manufacture of tires was prepared by combining the following ingredients in the ordinary manner of forming raw rubber compounds:
36.5 parts smoked sheet rubber,
20.0 parts No. 2 amber crepe rubber,
25.0 parts carbon black,
2.0 parts sulphur,
1.0 parts of a blended mineral and vegetable oil,
1.0 parts stearic acid,
3.5 parts mineral rubber,
11.0 parts zinc oxide,
1.0 parts phenyl-piperidyl-guanidine.

The above stock was found to yield a cured product of high quality when vulcanized by heating in a press for approximately one hour maintained under the temperature given by forty pounds of steam pressure per square inch.

Upon testing the product vulcanized under the conditions described it was found to possess a modulus of elasticity at 300% elongation of 1590 pounds per square inch, at 500% elongation of 3760 pounds per square inch, a tensile strength at break of 4515 pounds per square inch and an ultimate elongation of 575%. It is obvious that the vulcanized stock possessed particularly good characteristics for the use desired.

Another example of the applicability of my new type of accelerator is directed to the manufacture of a hard rubber product. A rubber compound was mixed in the usual manner comprising
20 parts No. 2 amber rubber,
29 parts smoked sheet rubber,
5 parts lime,
27.5 sulphur,
10 parts mineral rubber,
17.5 parts zinc oxide,
0.5 parts of one of my preferred class of accelerators.

The rubber compound was found to produce a product of satisfactory hardness after vulcanizing for about two hours and forty-five minutes in a press maintained at the temperature given by forty pounds of steam pressure per square inch.

The foregoing examples illustrate the use of my preferred class of compounds as rubber vulcanization accelerators in stocks of widely different types. Other examples are apparent to those skilled in the art to which this invention pertains in which different proportions of the ingredients employed may be used and also in which other compounding ingredients than those particularly set forth may be employed. My invention is therefore to be understood as not limited to the particular examples as set forth but is limited solely by the claims appended hereto as a part of this specification wherein I intend to claim all novelty inherent in my invention as is permissible in view of the prior art.

What I claim is:
1. The process of manufacturing vulcanized rubber which comprises combining with a rubber compound of vulcanization characteristics an unsymmetrically substituted guanidine accelerator, said accelerator comprising phenyl-piperidyl-guanidine.
2. As a new product, a vulcanized rubber derived from rubber, a vulcanizing agent and a vulcanizing ingredient comprising an unsymmetrically substituted guanidine accelerator, said accelerator comprising phenyl-piperidyl-guanidine.
3. The process of manufacturing a vulcanized rubber which comprises combining with a rubber compound of vulcanization characteristics an unsymmetrically tri-substituted guanidine accelerator, said accelerator containing within its molecule the phenyl, imino and piperidyl groupings.

In testimony whereof I have affixed my signature.

WILLIAM P. ter HORST.